United States Patent [19]

Ryan

[11] Patent Number: 4,851,200
[45] Date of Patent: Jul. 25, 1989

[54] METHOD FOR REMOVING ORGANIC RESIDUE FROM AS-SYNTHESIZED ZEOLITES

[75] Inventor: Francis X. Ryan, Lambertville, N.J.

[73] Assignee: Mobil Oil Corporation, New York, N.Y.

[21] Appl. No.: 140,362

[22] Filed: Jan. 4, 1988

[51] Int. Cl.$^4$ ............................................. C01B 33/28
[52] U.S. Cl. .................... 423/118; 423/326; 423/328; 502/85; 502/502
[58] Field of Search ............ 423/326, 328, 329, 118; 502/85, 86, 500, 501, 502, 506, 514, 515, 518, 150

[56] References Cited

U.S. PATENT DOCUMENTS

| | | | |
|---|---|---|---|
| 3,508,867 | 4/1970 | Frilette et al. | 423/328 |
| 3,766,093 | 10/1973 | Chu | 502/78 |
| 3,878,127 | 4/1975 | Rosback | 423/328 |
| 3,933,983 | 1/1976 | Elliott, Jr. | 423/328 |
| 3,950,495 | 4/1976 | Ciric | 423/328 |
| 3,969,276 | 7/1976 | Rosback | 423/328 |
| 4,273,753 | 6/1981 | Chang | 423/328 |
| 4,335,020 | 6/1982 | Chu et al. | 502/85 |
| 4,414,189 | 11/1983 | Kokotailo et al. | 423/328 |
| 4,477,584 | 10/1984 | Kaeding | 502/85 |
| 4,503,023 | 3/1985 | Breck et al. | 423/328 |
| 4,689,137 | 8/1987 | Clark | 208/89 |

FOREIGN PATENT DOCUMENTS 56-43230  4/1981  Japan .................................... 502/85

Primary Examiner—John Doll
Assistant Examiner—R. Bruce Breneman
Attorney, Agent, or Firm—Alexander J. McKillop; Charles J. Speciale; Edward F. Kenehan, Jr.

[57] ABSTRACT

There is provided a three-step method for removing the residue of an organic directing agent from as-synthesized zeolites. The first step involves contacting the as-synthesized zeolite with an aqueous solution of a fluorosilicate salt such as ammonium fluorosilicate. The second step involves ion-exchanging the zeolite with an alkali metal or alkaline earth metal salt such as KCl. The third step involves calcining the ion-exchanged zeolite. This method is particularly useful for removing the residue of an organic directing agent from ZSM-18.

2 Claims, No Drawings

METHOD FOR REMOVING ORGANIC RESIDUE FROM AS-SYNTHESIZED ZEOLITES

BACKGROUND

This application relates to a particular method for removing residual organic directing agent from zeolites.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by x-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of large dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as rigid three-dimensional frameworks of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This balanced electrovalence can be expressed by a formula wherein the ratio of aluminum to the number of various cations, such as Ca/2, Sr/2, Na, K or Li is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic zeolites. These zeolites have come to be designated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979 and zeolite ZSM-12 (U.S. Pat. No. 3,832,449), merely to name a few.

Although the term, zeolites, encompasses, materials containing silica and alumina, it is recognized that the silica and alumina portions may be replaced in whole or in part with other oxides. More particularly, $GeO_2$ is an art recognized substitute for $SiO_2$. Also, $B_2O_3$, $Cr_2O_3$, $Fe_2O_3$, and $Ga_2O_3$ are art recognized replacements for $Al_2O_3$. Accordingly, the term zeolite as used herein shall connote not only materials containing silicon and, optionally, aluminum atoms in the crystalline lattice structure thereof, but also materials which contain suitable replacement atoms for such silicon and/or aluminum. On the other hand, the term aluminosilicate zeolite as used herein shall define zeolite materials consisting essentially of silicon and aluminum atoms in the crystalline lattice structure thereof, as opposed to materials which contain substantial amounts of suitable replacement atoms for such silicon and/or aluminum.

Although certain zeolites can be prepared from totally inorganic reaction mixtures, the synthesis of other zeolites is often promoted or made possible by the inclusion of certain organic compounds, termed organic directing agents, in the reaction mixture. Note the article by Lok et al, entitled "The Role of Organic Molecules in Molecular Sieve Synthesis" appearing in *Zeolites*, 1983, Vol. 3, October, pp. 282–291. When such organic directing agents are used, they may be included in an aqueous reaction mixture containing reactants, e.g., sources of silica and alumina, necessary for the zeolite synthesis. The reaction mixture may then be maintained under sufficient conditions, e.g., at elevated temperature, until the desired crystals are formed. These crystals may then be recovered by filtration and washing the filtered crystals with water. This filtering and washing treatment separates the crystals from organic directing agent which is either included in the mother liquor of the reaction mixture or loosely associated with the exterior surface of the crystals. However, a residue of the organic directing agent, e.g., amines and especially quaternary ammonium compounds, usually remains more tenaciously attached to the zeolite crystals. This tenaciously attached residue, which is not removed by the filtering and washing treatment, may be occluded within the pores of the zeolite and/or firmly affixed to the surface of the zeolite. Certain residues which are tenaciously attached to the zeolite may occupy cation exchange sites of the zeolite, especially in the case of quaternary ammonium residues. It is particularly important to remove organic residue which occluded in the pores of the zeolite, because this type of residue may constitute obstructions which tend to substantially reduce the sorption capacity and catalytic activity of the zeolite.

In order to remove the residue of organic directing agents from as-synthesized zeolites, which residue cannot be readily removed by filtration and washing, the zeolite may be calcined at elevated temperatures, e.g., 400° C. or greater, e.g., in the presence of a source of oxygen such as air, for, e.g., at least one hour. This calcination treatment promotes the decomposition and/or volatilization of the residue. The presence of oxygen during the calcination further promotes oxidation, e.g., combustion, of the organic residue into oxidized species, e.g., carbon dioxide, carbon monoxide, water, and nitrogen oxides, which are evolved as gasses.

The above-mentioned calcination procedure is effective for removing organic directing agent residue from as-synthesized zeolites which are stable under the required conditions. However, certain as-synthesized zeolites tend to undergo a phase transformation, e.g., to a different crystalline form or to an amorphous material, under these conditions. One such zeolite is ZSM-18, especially species of ZSM-18 which have a low silica to alumina molar ratio. The Ciric U.S. Pat. No. 3,950,496, the entire disclosure of which is expressly incorporated herein by reference, describes ZSM-18 and the synthesis thereof. Example 6 of this Ciric patent points out that when the as-synthesized form of ZSM-18, prepared from a reaction mixture having a silica to alumina molar ratio of 9.0, was calcined at 1000° F. in air for 3 hours, the zeolite was substantially reduced to the amorphous state.

SUMMARY

According to one aspect of the present application, there is provided a method for removing organic material blocking pores of an as-synthesized zeolite, said as-synthesized zeolite being synthesized in the presence of an organic directing agent, said material being a residue of said organic directing agent remaining in said as-synthesized zeolite after the as-synthesized zeolite is separated from the mother liquor of the reaction mixture to prepare said as-synthesized zeolite, said as-synthesized zeolite tending to undergo a phase transformation upon heating to a temperature sufficient to remove said organic material from the pores of said zeolite, said method comprising the steps of:
(i) contacting said as-synthesized zeolite with an aqueous solution of a fluorosilicate salt, said solution containing at least 0.0075 moles of said fluorosilicate salt per 100 grams of said as-synthesized zeolite;
(ii) exchanging said fluorosilicate contacted zeolite of step (i) with a salt of an alkali metal or alkaline earth metal; and
(iii) calcining said exchanged zeolite of step (ii) at a temperature of at least 250° C.

According to another aspect of the present application, there is provided a method for removing the residue of an organic directing agent from the as-synthesized form of ZSM-18, said organic directing agent being 1,3,4,6,7,9-hexahydro-2,2,5,5,8,8-hexamethyl-2H-benzo (1,2,-C:-3,4-C':5,6-C'') tripyrolium trihydroxide, said method comprising the steps of:
(i) contacting said as-synthesized form of ZSM-18 with an aqueous solution of ammonium fluorosilicate, said solution containing at least 0.0075 moles of said ammonium fluorosilicate per 100 grams of said as-synthesized ZSM-18;
(ii) exchanging said ammonium fluorosilicate contacted ZSM-18 of step (i) with a salt of potassium;
(iii) calcining said exchanged ZSM-18 of step (ii) at a temperature of at least 250° C. in an atmosphere containing $NH_3$; and
(iv) repeating said steps (i), (ii) and (iii) at least once.

According to another aspect of the present application, there is provided a method for preparing the hydrogen form of ZSM-18 which is essentially free of residual organic directing agent, said method comprising the steps of:
(i) forming an aqueous reaction mixture capable of forming ZSM-18, said reaction mixture comprising a directing agent which is 1,3,4,6,7,9-hexahydro-2,2,5,5,8,8-hexamethyl-2H-benzo (1,2-C:-3,4-C':5,6-C'') tripyrolium trihydroxide, a source of sodium cations, a source of silica and a source of alumina, said reaction mixture having a composition, expressed in terms of mole ratios of T and oxides, as follows:
$SiO_2/Al_2O_3 = 5-30$
$Na_2O/Al_2O_3 = 0.2-5$
$H_2O/Al_2O_3 = 200-1500$
$T/Al_2O_3 = 1-10$
where T is said directing agent;
(ii) maintaining said reaction mixture of step (i) under conditions sufficient to form crystals of ZSM-18;
(iii) separating said ZSM-18 crystals of step (ii) from the mother liquor of said reaction mixture by filtering said crystals and washing said crystals with water, whereby an as-synthesized form of ZSM-18 is obtained, said as-synthesized ZSM-18 having a residue of said organic directing agent in the pores of said ZSM-18;
(iv) contacting said as-synthesized form of ZSM-18 of step (iii) with an aqueous solution of ammonium fluorosilicate, said solution containing at least 0.0075 moles of said ammonium fluorosilicate per 100 grams of said as-synthesized ZSM-18;
(v) exchanging said ammonium fluorosilicate contacted ZSM-18 of step (iv) with a salt of potassium;
(vi) calcining said exchanged ZSM-18 of step (v) at a temperature of at least 250° C. in an atmosphere containing $NH_3$;
(vii) repeating said steps (i), (ii) and (iii) at least once;
(viii) exchanging said ZSM-18 of step (vii) with an aqueous solution containing ammonium cations to obtain the ammonium exchanged form of ZSM-18; and
(ix) calcining said ammonium form of ZSM-18 of step (viii) under conditions sufficient to evolve $NH_3$ and to convert the ammonium form of ZSM-18 into the hydrogen form of ZSM-18.

EMBODIMENTS

There is provided a method for removing organic material blocking the pores of a zeolite. It is possible to determine whether organic material is blocking pores of a zeolite (e.g., by being occluded in the framework of a zeolite) by conducting an elemental analysis for carbon along with measuring the sorption capacity of the zeolite for molecules such as water, n-hexane and cyclohexane. The presence of significant amounts of carbon in the zeolite confirms that organic material is associated with the zeolite. A sorption capacity less than expected for the zeolite confirms that the organic material is blocking pores of the zeolite, thereby restricting access of sorbant molecules into the internal pore structure of the zeolite. The presence of organic material in the zeolite is also indicated when the zeolite darkens (e.g., turns grey or black) upon calcination. This darkening is associated with organic material turning into coke upon such calcination.

The organic material, which is to be removed from zeolites in accordance with methods of the present applicator, is a residue of organic directing agent which is used to prepare the zeolite. The molecules of this residue may be the same or different from the molecules of the organic directing agent. For example, when the organic directing agent is a neutrally charged amine of sufficiently small size, entire molecules of the amine may be occluded, within the internal framework of the as-synthesized zeolite. However, when a quaternary ammonium directing agent is used, cation portions thereof may be occluded within the framework by occupying cation exchange sites of the zeolite. Decomposition products of the organic directing agent may also be occluded within the framework of the as-synthesized form of the zeolite. It is generally observed that, whenever an organic directing agent is used to prepare a zeolite, a residue of the directing agent will remain affixed to the zeolite, which residue cannot be removed by separation of the mother liquor of the reaction mixture from the zeolite by mere filtration and washing of the zeolite crystals.

The residue of organic directing agents can be effectively removed from many zeolites by a simple calcination procedure. However, other zeolites tend to undergo a phase transformation under such calcination conditions. One such zeolite is ZSM-18, particularly forms of ZSM-18 having a relatively low silica to alumina molar ratio of e.g., 10 or less.

In accordance with a first step of methods described herein, zeolites containing a residue of an organic directing agent are contacted with an aqueous solution of fluorosilicate salt. Examples of such salts, solutions and contacting conditions are given in U.S. Pat. No. 4,503,023, the entire disclosure of which is expressly incorporated herein by reference. More particularly, a preferred fluorosilicate salt is ammonium fluorosilicate, but other fluorosilicate salts, such as sodium fluorosilicate, potassium fluorosilicate may be used. The fluorosilicate solution may contain at least 0.001 moles per liter, e.g., from about 0.3 to about 1.0 moles per liter, of fluorosilicate salt. The contact of zeolite with the fluorosilicate solution may take place at a temperature of from about 20° C. to about 125° C., e.g., from about 50° C. to about 95° C. As pointed out in the above-mentioned U.S. Pat. No. 4,503,023, the pH of the fluorosilicate solution may be from 3 to 7. However, it has been discovered that higher pH values, e.g., from 7 to 9, may also be appropriate for the fluorosilicate solution. This pH may be maintained in the solution by adding a suitable amount of ammonium hydroxide thereto. The zeolite may be contacted with the fluorosilicate solution for, e.g., at least one half hour, e.g., from about one hour to about 24 hours.

In accordance with a second step of methods described herein, the fluorosilicate contacted zeolite may be ion exchanged with a salt of an alkali metal or a alkaline earth metal. A preferred salt is a salt of potassium, especially potassium chloride.

In accordance with a third step of methods described herein, the exchanged zeolite is calcined at a temperature of at least 250° C., e.g., between 400° C. and 500° C. This calcination may take place for, e.g., at least one hour. This calcination preferably takes place in the presence of an ammonia containing gas.

These three steps involving fluorosilicate contact, ion-exchange and calcination may be repeated at least once. Without being bound by any theory, it is theorized that this three step process provides a means for enhancing the stability of the zeolite framework before substantial amounts of organic residue are removed by calcination. In this regard, the aforementioned U.S. Pat. No. 4,503,023 states that fluorosilicate salts can replace $AlO_4$ tetrahedra with $SiO_4$ tetrahedra. All other things being equal, the stability of zeolites, e.g., under steaming conditions, tends to increase as the proportion of $SiO_4$ tetrahedra increases with respect to the proportion of $AlO_4$ tetrahedra. The ion-exchange step, particularly when potassium ions are used, may further tend to impart greater stability to accessible portions of the zeolite framework which are not obstructed by the organic residue. Once these unobstructed portions of the zeolite framework are theoretically stabilized or shored up, organic residue may be removed from the zeolite by calcination treatment. It is further theorized that in some instances it may be desirable to sequentially remove portions of the organic residue from the zeolite by repeating the fluorosilicate contact and ion-exchange steps to theoretically stabilize portions of the zeolite framework from where organic residue has been removed before removing further organic residue by calcination. Accordingly, as mentioned hereinabove, it may be desirable to repeat the present three-step process at least once. After a sufficient degree of stability has been imparted to the zeolite, it may be possible to remove the remainder of the organic residue by more severe treatments. Repeated potassium ion-exchange followed by calcination may be useful for removing coke visually present as dark coloration on the zeolite.

Methods of the present application may be particularly useful in preparing a stable hydrogen form of ZSM-18 which is essentially free of residual organic directing agent (e.g., coke). ZSM-18 which is essentially free of residual organic directing agent may be light in coloration. The carbon analysis of this hydrogen form ZSM-18 will be much smaller, e.g., 5 percent by weight or less, than the as-synthesized ZSM-18.

As pointed out in the aforementioned U.S. Pat. No. 3,950,496, ZSM-18 may be prepared with a directing agent by the name of 1,3,4,6,7,9-hexahydro-2,2,5,5,8,8-hexamethyl-2H-benzo (1,2,-C:-3,4-C':5,6-C'') tripyrolium trihydroxide. Another name for this particular compound, which is used in the Examples appearing hereinafter, is tris-quaternary ammonium hydroxide.

COMPARATIVE EXAMPLE A

Tris-quaternary ammonium hydroxide was prepared as described in U.S. Pat. No. 3,950,496. This template was used to prepare ZSM-18 as outlined in the same patent, Example 3 and restated here.

$H_2O$: 210.8 g
Tris-quaternary ammonium hydroxide (1/2N): 225.1 g
$NaAlO_2$: 10.5 g
Tetramethyl-orthosilicate: 102.6 g The $NaAlO_2$ was dissolved in the $H_2O$ and tris-quaternary ammonium hydroxide. The tetramethylorthosilicate was added to this vigorously stirring solution resulting in a stiff gel after approximately two minutes. This gel was transferred to a 1 liter autoclave and heated to 125° C., with stirring at 300 RPMS for 18 days. The product was 100% ZSM-18, identified by its X-ray diffraction pattern.

The product ZSM-18 was filtered, washed with distilled $H_2O$, and dried at 80° C. to 90° C. This material was carefully calcined in a $N_2$ atmosphere from 25° C. to 450° C. at 1° C. per minute temperature increase and held for four hours. X-ray analysis of this material shows almost total loss of crystallinity. The material was further calcined as described above but in an air atmosphere. This product was completely amorphous by X-ray analysis.

COMPARATIVE EXAMPLE B

Another sample of as synthesized, washed and dried ZSM-18 was calcined in an $NH_3$ atmosphere from 25° C. to 450° C. at 1° C. per minute temperature increase and held four hours. This material retained some crystallinity but was totally coked. This sample was further calcined in an $NH_3$/air atmosphere (50% each) from 25° C. at 1° C./minute and held four hours at 450° C. in an attempt to remove the coke. The product was totally amorphours.

COMPARATIVE EXAMPLE C

Another sample of as synthesized, washed and dried ZSM-18 was subjected to silicon tetrachloride treatment as described in U.S. Pat. No. 4,273,753. The zeolite did not survive under these conditions.

EXAMPLE 1

A sample of a ZSM-18 synthesized as described in Comparative Example A was filtered, rinsed and then exchanged with a solution of 178.2 mg $(NH_4)_2SiF_6$ per gram of zeolite. The pH was maintained between 7.0 and 7.5 with dilute $NH_4OH$. A 0.5M solution of $(NH_4)_2SiF_6$ was prepared by dissolving 1.7815 grams of the salt in 20.0 grams of $H_2O$. 10 grams of the zeolite was suspended in 100 grams of $H_2O$ and heated to 50° C. The $(NH_4)_2SiF_6$ solution was added to the vigorously stirring zeolite slurry over one hour via a syringe pump, the pH was controlled with dilute $NH_4OH$ using an automatic titrator. This preparation was stirred at 50° C. for an additional two hours. Then it was filtered, rinsed with $H_2O$ and dried. The sample was then potassium exchanged using 1M KCl solution pH 8.0 at the rate of 20 ml per gram of zeolite. This exchange was conducted at 60° C. with stirring for two hours. The pH was maintained at 8.0 with dilute KOH during this period. The preparation was then filtered and the KCl exchange repeated twice. The sample was filtered, rinsed and dried. This exchanged zeolite was then calcined in an $NH_3$ atmosphere. The zeolite was heated in a tube furnace from 25° C. to 350° C. at 1° C. per minute and held at 450° C. for four hours in a 5% $NH_3$: 95% He gas mixture flowing at 450 cc per minute. The sample was cooled to room temperature and X-rayed. Crystallinity was excellent but the zeolite still contained a large amount of coke. This sample was treated with $(NH_4)_2SiF_6$ and exchanged with KCl following the above protocol. The zeolite was then calcined in a 5% $NH_3$/95% He (300 cc/min): Air (300 cc/min) atmosphere from 25° C. to 500° C. and held for one hour. X-ray analysis of this material showed excellent ZSM-18 but the sample still contained some coke. This sample was then KCl exchanged as previously described. A further calcination was carried out on this material using the above described $NH_3$/He: Air atmosphere and heating from 25° C. to 450° C. at 10° C./minute, holding four hours. The temperature was raised to 500° C. and held for one hour. This sample maintained excellent crystallinity and was free of coke. An ammonium exchange was carried out on this material using 20 ml of 1 M $NH_4Cl$ pH 8.0 per gram of zeolite in a teflon bottle with agitation at 95° C. for two hours. The exchange solution was decanted and replaced and the slurry heated for an additional two hours. The zeolite was filtered, rinsed with dilute $NH_4Cl$ and air dried. Temperature Programmed Desorption (TPD) of $NH_3$ by Thermogravimetric analysis (TGA) showed a zeolite having a $SiO_2$: $Al_2O_3$ ratio of 30:1. X-ray analysis of this H form ZSM-18 showed excellent crystallinity.

EXAMPLE 2

An as synthesized ZSM-18 was treated in the manner described in Example 1 but with the addition of one more $(NH_4)_2SiF_6$ treatment prior to the last KCl exchange. This material has superior characteristics to that described in Example 1.

EXAMPLE 3

This sample of ZSM-18 was treated exactly as the material in Example 2, yielding a zeolite with excellent characteristics. The $SiO_2$:$Al_2O_3$ ratio of this sample is 28.8:1 by TGA analysis.

EXAMPLE 4

Sorption capacities for of the zeolite described in Example 1 are:
Normal hexane: 10.0% @25° C.
Cyclohexane: 10.0% @25° C.
Water: 18.0% @25° C.

EXAMPLE 5

Sorption capacities for the zeolite described in Example 2 are:
Normal hexane: 10.9% @25° C.
Cyclohexane: 9.0% @25° C.
Water: 20.7% @25° C.
Alpha test shows a zeolite with a value of 244.2 to 83.3.

EXAMPLE 6

Sorption capacities for the zeolite described in Example 3 are:
Normal hexane: 16.5%@25° C.
Cyclohexane: 18.0%@25° C.
Water: 19.0%@25° C.

What is claimed is:

1. A method for removing the residue of an organic directing agent from the as-synthesized form of ZSM-18, said organic directing agent being 1,3,4,6,7,9-hexahydro-2,2,5,5,8,8-hexmethyl-2H-benzo (1,2,-C:-3,4-C':5,6-C'') tripyrolium trihydroxide, said method comprising the steps of:
(i) contacting said as-synthesized form of ZSM-18 with an aqueous solution of ammonium fluorosilicate, said solution containing at least 0.0075 moles of said ammonium fluorosilicate per 100 grams of said as-synthesized ZSM-18;
(ii) contacting said ammonium fluorosilicate contacted ZSM-18 of step (i) with a salt of potassium;
(iii) calcining said ZSM-18 of step (ii) at a temperature of at least 250° C. in an atmosphere containing $NH_3$; and
(iv) repeating said steps (i), (ii) and (iii) at least once.

2. A method for preparing the hydrogen form of ZSM-18 which is essentially free of residual organic directing agent, said method comprising the steps of:
(i) forming an aqueous reaction mixture capable of forming ZSM-18, said reaction mixture comprising a directing agent which is 1,3,4,6,7,9-hexahydro-2,2,5,5,8,8-hexamethyl-2H-benzo (1,2,-C:-3,4,-C':5,6-C'') tripyrolium trihydroxide, a source of sodium cations, a source of silica and a source of alumina, said reaction mixture having a composition, expressed in terms of mole ratios of T and oxides, as follows:
$SiO_2/Al_2O_3 = 5-30$
$Na_2O/Al_2O_3 = 0.2-5$
$H_2O/Al_2O_3 = 200-1500$
$T/Al_2O_3 = 1-10$
where T is said directing agent;
(ii) maintaining said reaction mixture of step (i) under conditions sufficient to form crystals of ZSM-18;
(iii) separating said ZSM-18 crystals of step (ii) from the mother liquor of said reaction mixture by filtering said crystals and washing said crystals with water, whereby an as-synthesized form of ZSM-18 is obtained, said as-synthesized ZSM-18 having a residue of said organic directing agent in the pores of said ZSM-18;
(iv) contacting said as-synthesized form of ZSM-18 of step (iii) with an aqueous solution of ammonium fluorosilicate, said solution containing at least 0.0075 moles of said ammonium fluorosilicate per 100 grams of said as-synthesized ZSM-18;
(v) contacting said ammonium fluorosilicate contacted ZSM-18 of step (iv) with a salt of potassium;
(vi) calcining said ZSM-18 of step (v) at a temperature of at least 250° C. in an atmosphere containing $NH_3$;

(vii) repeating said steps (i), (ii) and (iii) at least once;
(viii) contacting said ZSM-18 of step (vii) with an aqueous solution containing ammonium cations to obtain the ammonium exchanged form of ZSM-18; and
(ix) calcining said ammonium form of ZSM-18 of step (viii) under conditions sufficient to evolve $NH_3$ and to convert the ammonium form of ZSM-18 into the hydrogen form of ZSM-18.

* * * * *

UNITED STATES PATENT AND TRADEMARK OFFICE
CERTIFICATE OF CORRECTION

PATENT NO. : 4,851,200

DATED : July 25, 1989

INVENTOR(S) : Francis X. Ryan

It is certified that error appears in the above-identified patent and that said Letters Patent is hereby corrected as shown below:

Col. 4, line 44     "applicator" to --application--

Col. 5, line 51     "step." to --step,--

Signed and Sealed this

Eighteenth Day of September, 1990

Attest:

HARRY F. MANBECK, JR.

*Attesting Officer*     *Commissioner of Patents and Trademarks*